(12) United States Patent
Kim et al.

(10) Patent No.: US 7,484,613 B2
(45) Date of Patent: Feb. 3, 2009

(54) PARKING BRAKE APPARATUS FOR AUTOMATIC TRANSMISSION VEHICLE AND METHOD FOR CONTROLLING OPERATION THEREOF

(75) Inventors: Yeon Ho Kim, Suwon-si (KR); Kyung Won Hwang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 383 days.

(21) Appl. No.: 11/302,075

(22) Filed: Dec. 12, 2005

(65) Prior Publication Data

US 2007/0039798 A1 Feb. 22, 2007

(30) Foreign Application Priority Data

Aug. 19, 2005 (KR) .................... 10-2005-0076266

(51) Int. Cl.
*B60T 1/06* (2006.01)
(52) U.S. Cl. .................................. 192/219.5
(58) Field of Classification Search .............. 192/219.5
See application file for complete search history.

(56) References Cited

U.S. PATENT DOCUMENTS 5,827,149 A * 10/1998 Sponable ............... 477/92
6,125,983 A * 10/2000 Reed et al. ............. 192/219.5
6,401,899 B1 * 6/2002 Kanehisa et al. ....... 192/219.5
2005/0066759 A1 * 3/2005 Hirota et al. ............ 74/473.1

FOREIGN PATENT DOCUMENTS

| DE | 10316949 A1 * | 11/2004 |
|---|---|---|
| JP | 09-288312 | 11/1997 |
| JP | 2000-074211 | 3/2000 |

* cited by examiner

*Primary Examiner*—Richard M. Lorence
(74) *Attorney, Agent, or Firm*—Morgan, Lewis & Brockius LLP

(57) ABSTRACT

A parking brake apparatus for an automatic transmission vehicle in one embodiment includes a parking shaft connected to a shift lever, a cam plate secured to the parking shaft, a parking rod assembly operated when the cam plate secured to the parking shaft rotates through manipulation of the shift lever, and a parking gear meshed with a sprag which is actuated by the parking rod assembly. The apparatus comprises a driving section having a driving motor assembly for driving the parking shaft such that the sprag can be engaged with or disengaged from the parking gear when the shift lever is manipulated between P and R, and operating to ensure that a rotational force of a driving motor is added to a disengaging force of the parking rod assembly for disengaging the sprag engaged with the parking gear when the disengaging force is insufficient.

12 Claims, 6 Drawing Sheets

PARKING BRAKE APPARATUS FOR AUTOMATIC TRANSMISSION VEHICLE AND METHOD FOR CONTROLLING OPERATION THEREOF

CROSS-REFERENCE TO RELATED APPLICATION

This application claims priority to and the benefit of Korean Patent Application 10-2005-0076266 filed in the Korean Intellectual Property Office on Aug. 19, 2005, the entire content of which is incorporated herein by reference.

FIELD OF THE INVENTION

The present invention relates to a parking brake apparatus for an automatic transmission vehicle, which is installed on a hybrid vehicle or a vehicle having an automatic transmission and in which operation of a parking shaft for actuating a sprag to be engaged with and disengaged from a parking gear is controlled using a driving motor assembly, and a method for controlling operation thereof

DESCRIPTION OF THE RELATED ART

As generally known in the art, a transmission of a vehicle is installed between an engine and a propeller shaft to change a rotational force and a speed of power outputted from the engine so that the changed rotational force and speed can be suited for a running state of the vehicle, and to transmit the changed power to wheels. Transmissions are divided into a manual transmission which is changed among predetermined gear ratios, and an automatic transmission which automatically operates along with a clutch in conformity with a speed and a load of a vehicle.

In a vehicle having an automatic transmission, six shift modes, that is, P, R, N, D, 2 and L modes are presented on a shift lever so that a driver can select one of the six shift modes through manipulation of the shift lever. P means parking, R reverse, N neutral, D drive, 2 second, and L lock-up. As the shift lever provided beside a driver's seat is manipulated, a shift cable operates, and in turn, a parking shaft connected to the shift cable is operated. If the driver manipulates the shift lever from P to R to move the vehicle which is in a parked state, the parking shaft, a cam plate secured to the parking shaft, and a parking rod assembly are sequentially operated. As the parking rod assembly is operated, a sprag 5 is actuated to be disengaged from the parking gear.

In a state in which the sprag is engaged with the parking gear, the sprag can be disengaged from the parking gear by virtue of a disengaging force which is a reaction force generated from a spring installed on the parking rod assembly. However, the conventional parking brake apparatus is prone to malfunction since the disengaging force applied to the sprag upon gearshift from P to R may insufficient and gearshift from P to R may not be reliably implemented as the driver demands to disengage the sprag from the parking gear. If the gearshift is not properly implemented, it is necessary for the driver to get out of the vehicle and push the vehicle in an opposite direction to decrease the engaging force between the parking gear and the sprag to release the sprag from the parking gear, whereby inconvenience is caused.

SUMMARY OF THE INVENTION

The present invention overcomes the above-mentioned problems and provides a parking brake apparatus for an automatic transmission vehicle which reliably disengages the sprag from the parking gear when a gearshift from P to R is implemented by the driver. The parking brake apparatus may be installed on a hybrid vehicle or a vehicle having an automatic transmission, and in which a driving section for operating a parking shaft is arranged in a manner such that the output of the driving section can be controllably changed to adjust engaging and disengaging forces between a sprag and a parking gear. In particular, the output of the driving section can be increased when a disengaging force is insufficient upon gearshift from P to R. A method for controlling operation thereof is also provided.

According to one aspect of the present invention, a parking brake apparatus for an automatic transmission vehicle includes a parking shaft connected to a shift lever, a cam plate secured to the parking shaft, a parking rod assembly operated when the cam plate secured to the parking shaft rotates through manipulation of the shift lever, and a parking gear meshed with a sprag which is actuated by the parking rod assembly. The apparatus may preferably further include a driving section having a driving motor assembly for driving the parking shaft such that the sprag can be engaged with or disengaged from the parking gear when the shift lever is manipulated between a parking mode and a reverse mode. Preferably, the driving section operates to ensure that a rotational force generated by the driving motor is added to a disengaging force created by the parking brake apparatus for positively disengaging the sprag from the parking gear when the disengaging force is insufficient.

According to another aspect of the present invention, there is provided a method for controlling operation of a parking brake apparatus for an automatic transmission vehicle. In one embodiment, the method may include the steps of sensing, by a hybrid control unit information including a speed and a gear ratio of the vehicle and an engagement speed of a sprag with respect to a parking gear when a shift lever is manipulated between a parking mode and a reverse mode, transmitting the information to a torque control unit, and judging the information in the torque control unit; receiving, by a transmission control ECU, the information judged in the torque control unit; and engaging or disengaging the sprag with or from the parking gear under the control of the transmission control ECU.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1:
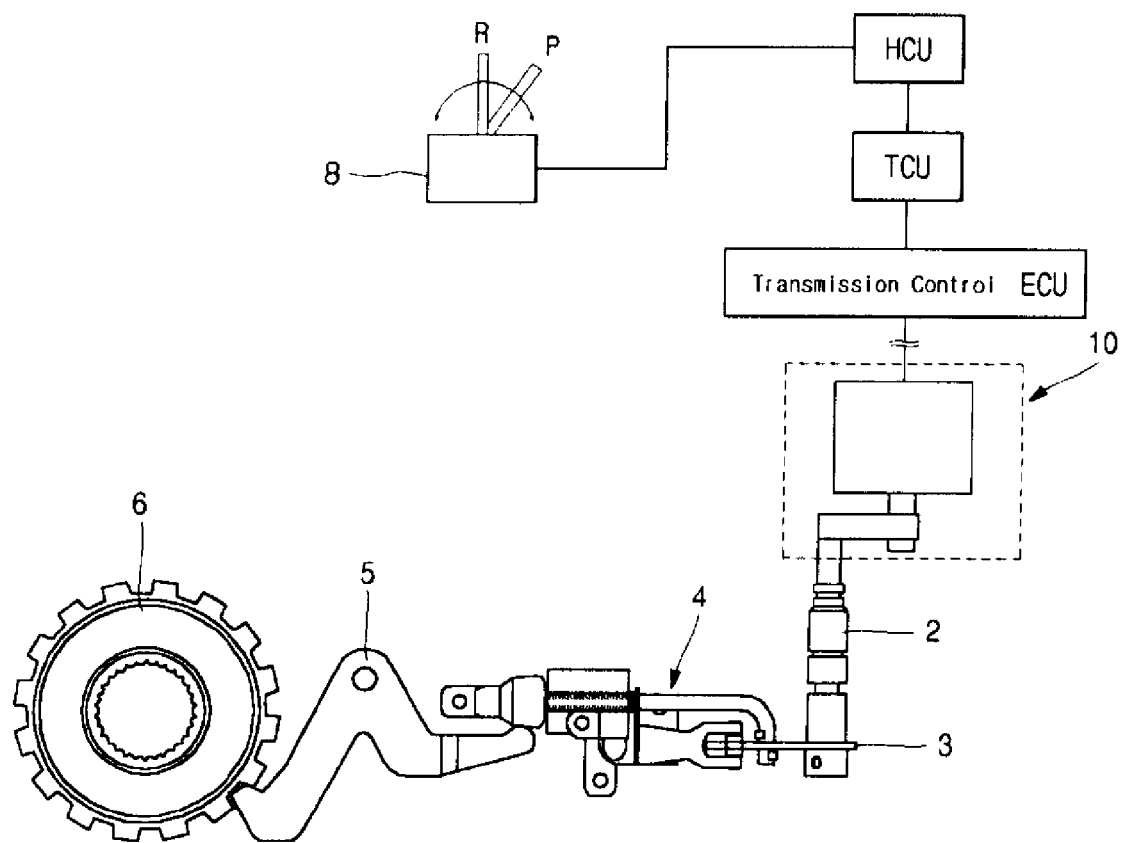
FIG. 1 is a view illustrating a parking brake apparatus for an automatic transmission vehicle in accordance with an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Referring to FIG. 1, an exemplary embodiment of a parking brake apparatus includes a parking shaft 2 connected to a shift lever 8, a cam plate 3 secured to the parking shaft 2, a parking rod assembly 4 which is operated when the cam plate 3 secured to the parking shaft 2 rotates through manipulation of the shift lever 8, and a parking gear 6 meshed with a sprag 5 which is actuated by the parking rod assembly 4.

The parking brake apparatus in one embodiment further includes a driving section 10 having a driving motor assembly for driving a parking shaft 2 such that a sprag 5 can be engaged with or disengaged from a parking gear 6 when a shift lever 8 is manipulated between a parking mode 'P' and a reverse mode 'R'. Preferably, the driving section 10 operates in such a way as to ensure that a rotational force of a driving motor is added to a disengaging force for disengaging the sprag 5 from the parking gear 6 when the disengaging force is insufficient. The driving section 10 may be constituted only by the driving motor or may additionally have the driving motor assembly which connects the driving motor to the parking shaft 2 to allow operation of the parking shaft 2. It is preferred that the driving section 10 rotate the parking shaft 2 in opposite directions when the shift lever 8 is manipulated from the parking mode to the reverse mode and vice versa.

The driving section 10 is connected to a hybrid control unit (HCU) which receives signals indicative of a speed of a vehicle, running conditions of an engine and a battery, etc. from various sensors (not shown) installed on a vehicle, a torque control unit (TCU) which receives the signals transmitted from the hybrid control unit and judges an engagement speed of the sprag 5 with respect to the parking gear 6, and a transmission control ECU which receives a signal transmitted from the torque control unit and operates the driving section 10.

Figure 2:
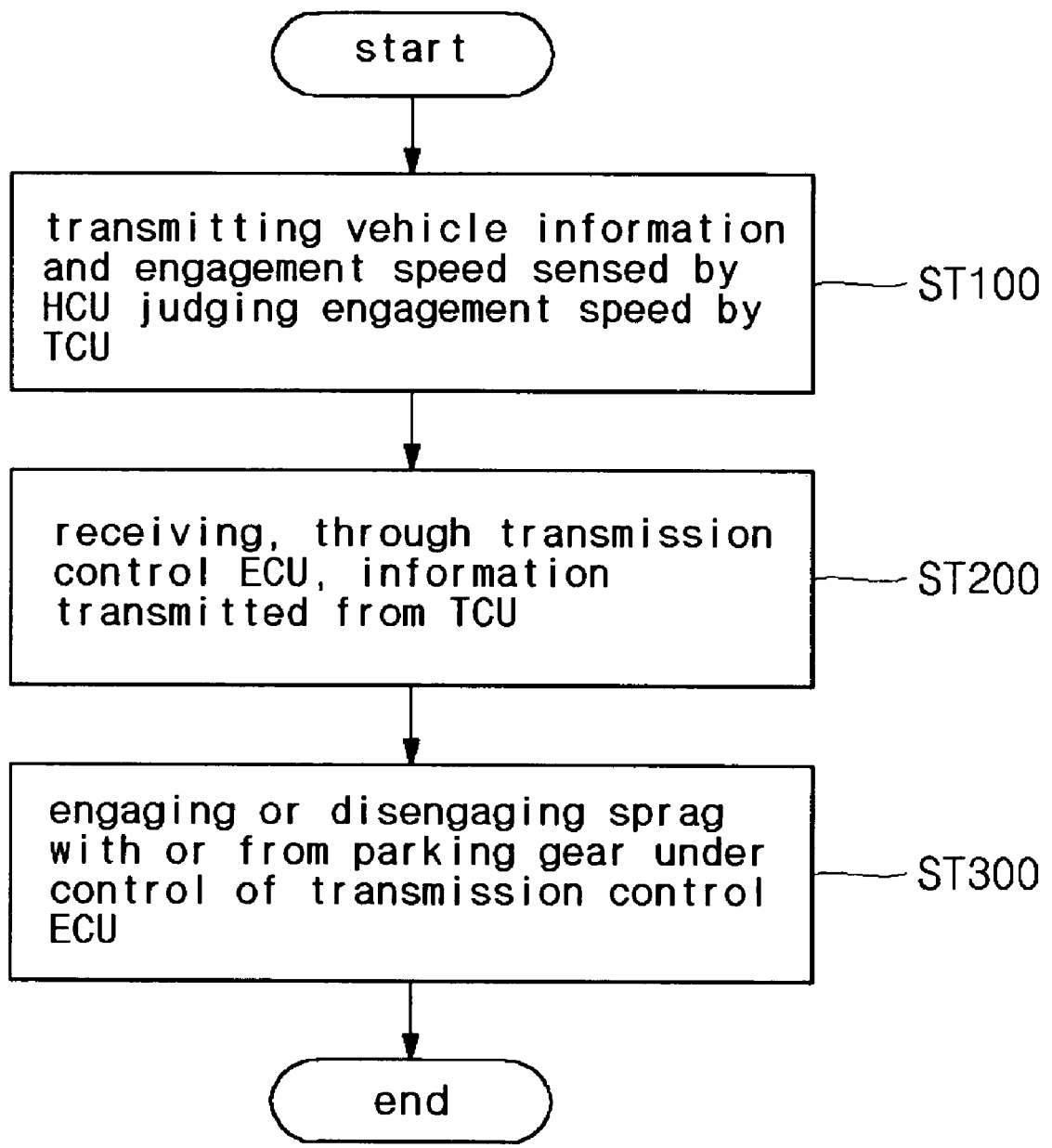
FIG. 2 is a flow chart illustrating a method for controlling operation of a parking brake apparatus for an automatic transmission vehicle in accordance with another embodiment of the present invention.
Figure 3:
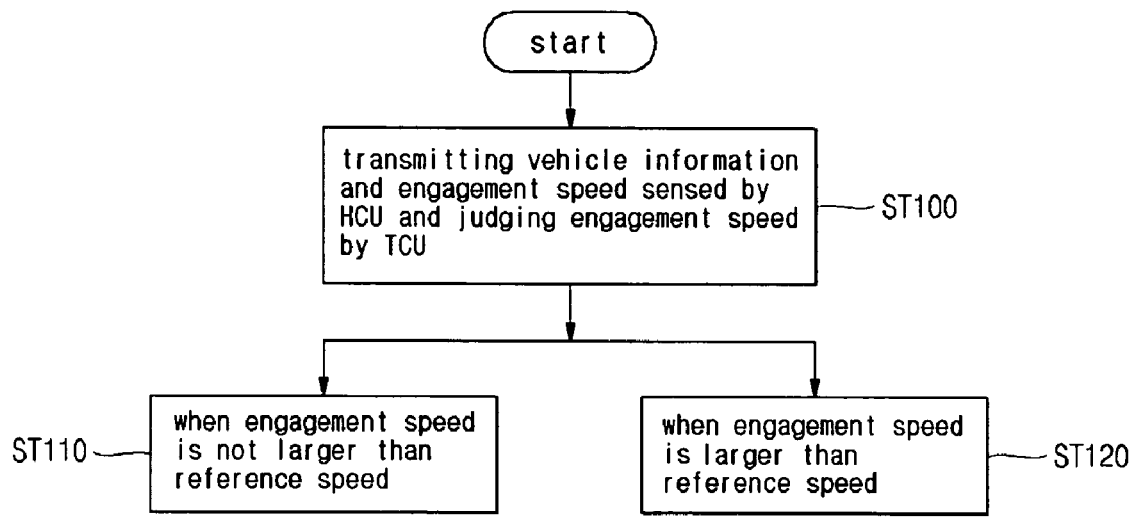
FIG. 3 is a flow chart illustrating a judgment step implemented by a TCU in the method for controlling operation of a parking brake apparatus for an automatic transmission vehicle according to the present invention.
Figure 4:
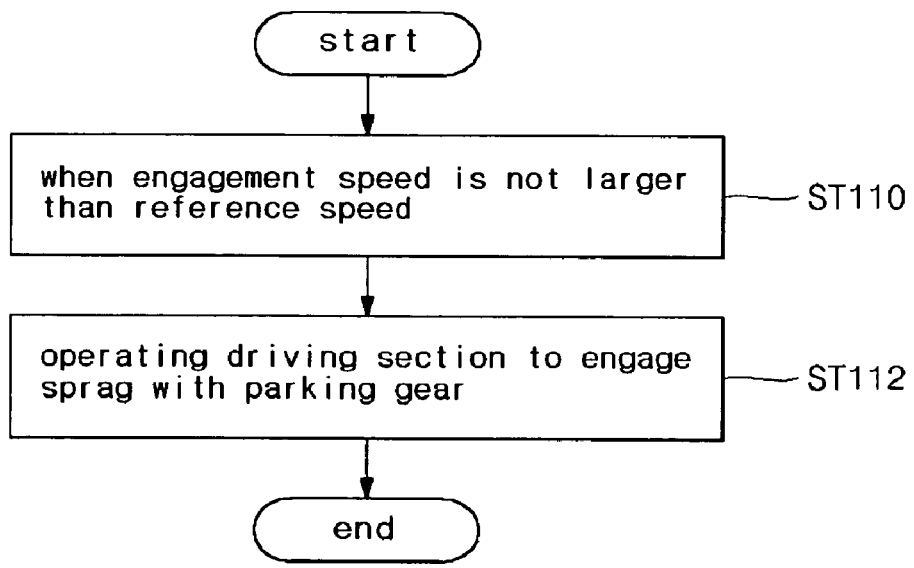
FIG. 4 is a flow chart illustrating a control procedure when an engagement speed is not larger than a reference speed in the method for controlling operation of a parking brake apparatus for an automatic transmission vehicle according to the present invention.

Referring to FIG. 2, a method for controlling operation of the parking brake apparatus for an automatic transmission vehicle according to the present invention, constructed as mentioned above, is illustrated. The methods comprises the steps of sensing, by the hybrid control unit, information including a speed and a gear ratio of the vehicle and an engagement speed of the sprag with respect to the parking gear when the shift lever 8 is manipulated between the parking mode and the reverse mode, transmitting the information to the torque control unit, and judging the information by the torque control unit (ST100); receiving, by the transmission control ECU, the information judged in the torque control unit (ST200); and engaging or disengaging the sprag with or from the parking gear under the control of the transmission control ECU (ST300).

It is preferred that the step of transmitting the information to the torque control unit and judging the information by the torque control unit (ST100) be divided into the step when the engagement speed is not larger than a reference speed (ST110) and the step when the engagement speed is larger than the reference speed (ST120). The engagement speed indicates the speed at which the sprag can be readily meshed with the parking gear.

It is preferred that the step when the engagement speed is not larger than the reference speed (ST110) comprise the step of operating the driving section and engaging the sprag with the parking gear (ST112).

It is preferred that the step when the engagement speed is larger than the reference speed (ST120) comprise the step of not operating the driving section and not engaging the sprag with the parking gear (ST122).

It is preferred that the step of engaging or disengaging the sprag with or from the parking gear under the control of the transmission control ECU (ST300) comprise the step of actuating the sprag and freeing the parking gear when the shift lever 8 is manipulated from P to R (ST310).

It is preferred that the step of actuating the sprag and freeing the parking gear when the shift lever 8 is manipulated from P to R (ST310) be divided into the step when the sprag is disengaged from the parking gear (ST312) and the step when the sprag is not disengaged from the parking gear (ST314).

It is preferred that the step when the sprag is not disengaged from the parking gear (ST314) comprise the step of sensing, by the hybrid control unit, a non-disengaged state of the sprag (ST315), and the step of transmitting a signal indicative of the non-disengaged state of the sprag to the transmission control ECU and returning to the step of actuating the sprag and freeing the parking gear when the shift lever 8 is manipulated from P to R (ST3 16).

Hereafter, operation of the parking brake apparatus for an automatic transmission vehicle and the method for controlling the operation of the parking brake apparatus according to the present invention, constructed as mentioned above, will be described with reference to the attached drawings.

Referring to FIGS. 1 through 4, in a state in which a driver gets on a vehicle, after the vehicle travels on the road and arrives at a destination, when it is necessary to park the vehicle, the parking brake apparatus according to the present invention operates as described below.

When the driver manipulates the shift lever 8 from R to P to park the vehicle, information regarding a speed, a gear ratio, etc. of the vehicle and information regarding an engagement speed of the sprag 5 with respect to the parking gear 6 are transmitted to the torque control unit by the hybrid control unit (ST100).

The torque control unit which receives the information regarding the vehicle and information regarding an engagement speed from the hybrid control unit judges whether the engagement speed is not larger than a reference speed (ST110) or larger than the reference speed (ST120). When it is judged that the engagement speed is not larger than the reference speed (ST110), the transmission control ECU receives a signal for operating the driving motor assembly which is provided to the driving section 10 (ST200), and then, the driving section 10 is operated to engage the sprag 5 with the parking gear 6 under the control of the transmission control ECU (ST112).

As the driving motor assembly provided to the driving section 10 is operated to engage the sprag 5 with the parking gear 6, the parking shaft 2 is rotated in one direction. Then, the operation of the cam plate 3 due to the rotation of the parking shaft 2 is transmitted to the parking rod assembly 4 to actuate the sprag 5. Thereupon, as the sprag 5 is meshed with the parking gear 6, the vehicle is kept in a parked state.

Operation when it is determined that the engagement speed is larger than the reference speed (ST120) will be described below.

Figure 5:
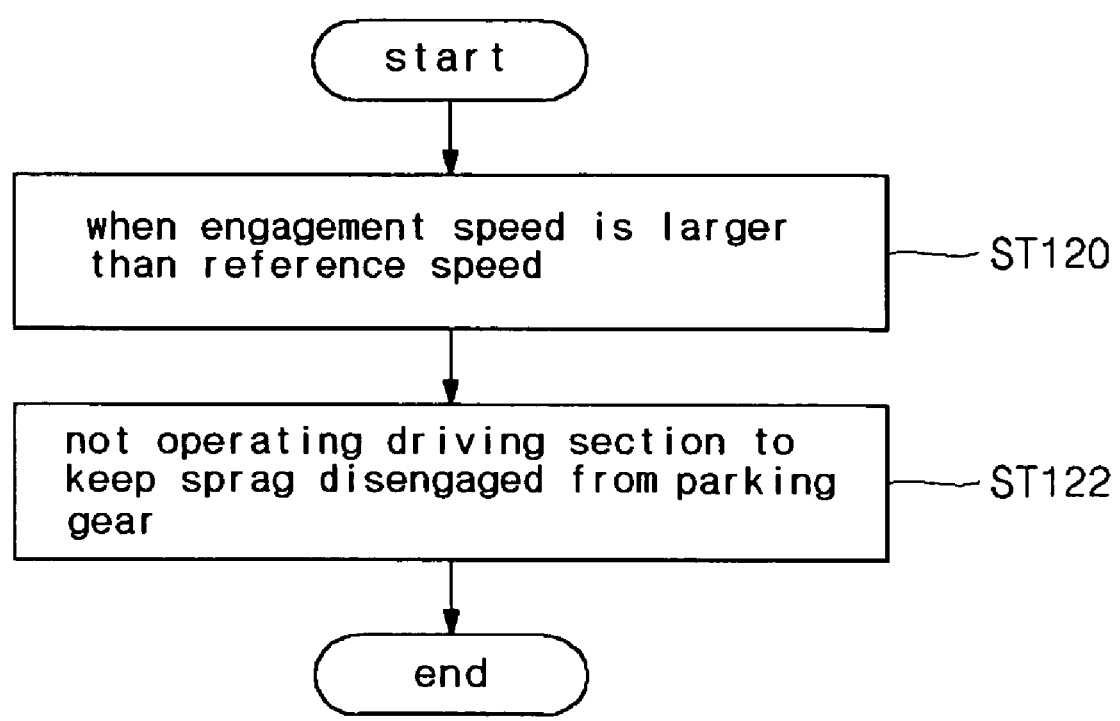
FIG. 5 is a flow chart illustrating a control procedure when an engagement speed is larger than the reference speed in the method for controlling operation of a parking brake apparatus for an automatic transmission vehicle according to the present invention.

Referring to FIG. 5, while the vehicle travels at a speed of no less than 10 km/h, if the driver manipulates the shift lever 8 from the reverse mode to the parking mode, as the sprag 5 approaches the parking gear 6 to be engaged therewith, shock may be produced and noise may be generated, and thereby, the sprag 5 and the parking gear 6 are likely to be damaged or broken. Therefore, in consideration of this, when it is judged by the torque control unit that the engagement speed is not larger than the reference speed (ST 120), the torque control unit transmits a signal indicating the corresponding state to the transmission control ECU (ST200). Then, the transmission control ECU having received the signal outputs an instruction signal for not operating the driving motor provided to the driving section 10 so that the sprag 5 is not engaged with the parking gear 6 (ST122).

As a consequence, the sprag 5 and the parking gear 6 are not engaged with each other and held in a standby state. Then, when a speed of the vehicle decreases and an engagement speed is not larger than the reference speed (ST110), the driving section 10 is operated to engage the sprag 5 and the parking gear 6 with each other and hold the vehicle in the parked state (ST112).

If the driver manipulates the shift lever 8 from P to R to move the vehicle kept in the parked state, the parking brake apparatus according to the present invention operates as described below.

Figure 6:
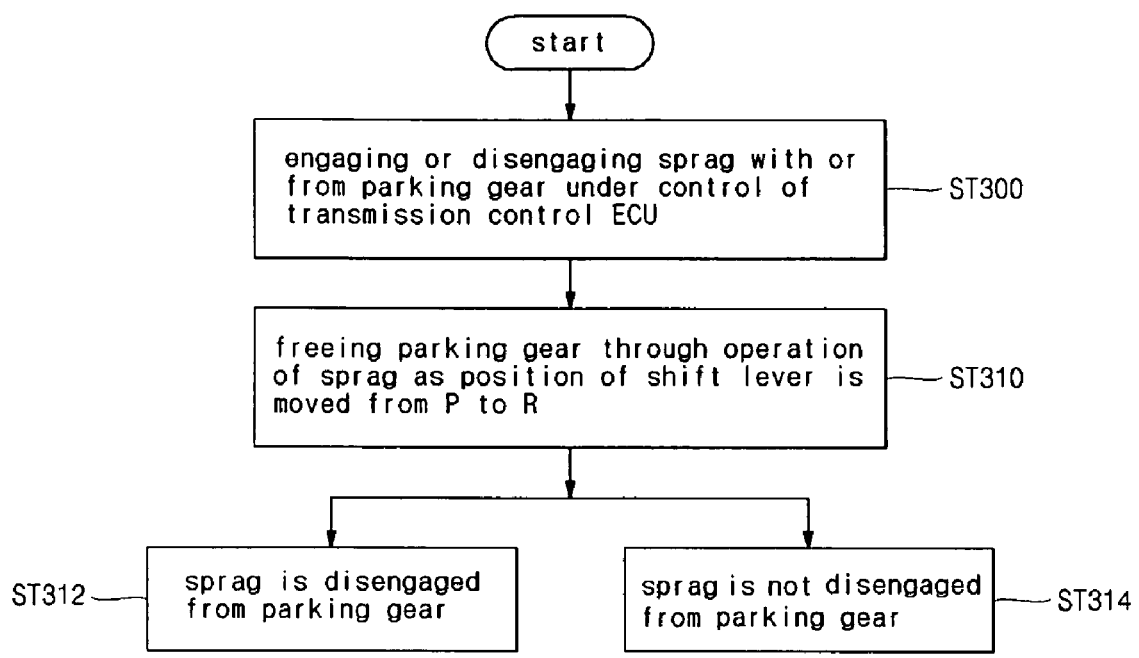
FIG. 6 is a flow chart illustrating steps for engaging and disengaging a sprag with and from a parking gear in the method for controlling operation of a parking brake apparatus for an automatic transmission vehicle according to the present invention.
Figure 7:
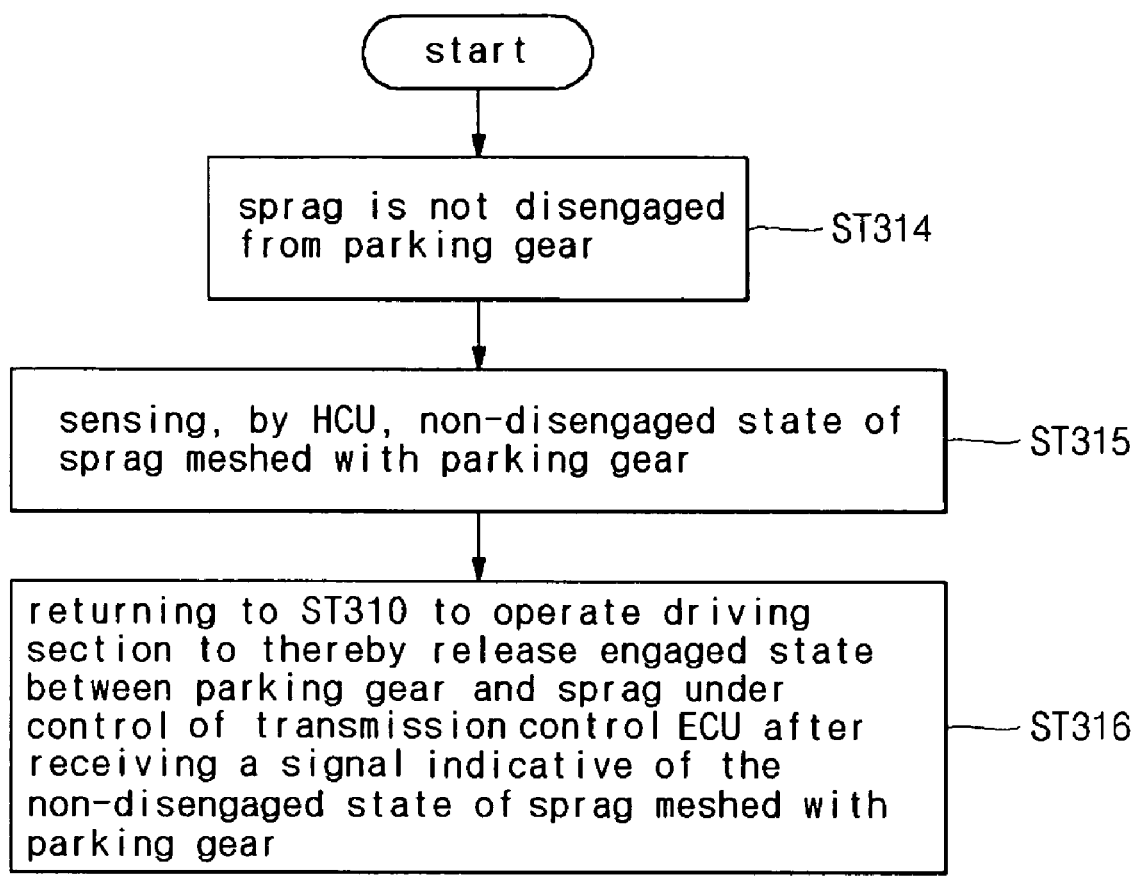
FIG. 7 is a flow chart illustrating a control procedure when the sprag is not disengaged from the parking gear, in the method for controlling operation of a parking brake apparatus for an automatic transmission vehicle according to the present invention.

Referring to FIGS. 6 and 7, as the shift lever 8 is manipulated from P to R, information regarding a speed, a gear ratio, etc. of the vehicle and information regarding an engagement speed are transmitted to the torque control unit by the hybrid control unit (ST100). Then, the information judged by the torque control unit is received by the transmission control ECU (ST200). The transmission control ECU operates the driving section 10 to disengage the sprag 5 from the parking gear 6. By this fact, as the driving motor of the driving section 10 is operated to allow the sprag 5 to be disengaged from the parking gear 6, the engagement force between the sprag 5 and the parking gear 6 is overcome, and the parked state is released (ST312).

As the driving motor assembly provided to the driving section 10 is operated to release the engagement between the sprag 5 and the parking gear 6, the parking shaft 2 is rotated in opposite direction. Then, the operation of the cam plate 3 which is caused due to the rotation of the parking shaft 2 is transmitted to the parking rod assembly 4 to actuate the sprag 5. As the sprag 5 is disengaged from the parking gear 6, that is, when the engagement between the sprag 5 and the parking gear 6 is released due to the actuation of the sprag 5, the vehicle can be moved. If the engagement between the sprag 5 and the parking gear 6 is not released even through the operation of the driving section 10 (ST314), the parking brake apparatus according to the present invention operates as described below.

The hybrid control unit recognizes the situation in which the parked state is released even through the operation of the driving motor of the driving section 10 (ST314). The hybrid control unit senses this situation through sensors (not shown) installed on the vehicle (ST315). Thereafter, the hybrid control unit transmits a signal for increasing a torque, that is, a rotational force of the driving motor provided to the driving section 10, to the transmission control ECU, in an effort to release the parked state.

The transmission control ECU which receives the signal transmitted from the hybrid control unit increases a torque of the driving motor to allow the engagement between the sprag 5 and the parking gear 6 to be released, and thereby operates the parking shaft 2. The rotational force of the parking shaft 2 is transmitted to the cam plate 3 and the parking rod assembly 4, and actuates the sprag 5 to disengage the sprag 5 from the parking gear 6. In this way, feedback operation of the parking brake apparatus is implemented (ST316).

In response to an instruction from the transmission control ECU, the above-described procedure is repeated until the engagement between the sprag 5 and the parking gear 6 is released, to effect the feedback operation (ST316), as a result of which it is possible to overcome the mechanical coupling force between the sprag 5 and the parking gear 6 and disengage them from each other. Hence, when the shift lever 8 is manipulated from P to R, if the mechanical coupling force between the sprag 5 and the parking gear 6 is not released, the feedback operation is implemented, whereby the torque of the driving motor provided to the driving section 10 can be controllably increased and the parked state can be released to allow the vehicle to move.

As is apparent from the above descriptions, the parking brake apparatus for an automatic transmission vehicle according to the present invention, installed on a hybrid vehicle or a vehicle having an automatic transmission, provides advantages in that operation of a parking shaft for actuating a sprag to be engaged with and disengaged from a parking gear is controlled using a driving motor assembly. Therefore, when a disengaging force upon gearshift from P to R does not overcome an engaging force between the sprag and the parking gear, a torque of a driving motor can be adjusted to overcome the mechanical engaging force between the sprag and the parking gear, whereby it is possible to move the vehicle which is in a parked state. Further, when a shift lever is manipulated from P to R to park the vehicle, it is possible to prevent the sprag and the parking gear from being damaged due to the excessive engaging force between the parking gear and the sprag and to suppress generation of noise.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A parking brake apparatus for an automatic transmission vehicle, the apparatus comprising:
   a parking shaft connected to a shift lever;
   a cam plate secured to the parking shaft;
   a parking rod assembly operated when the cam plate secured to the parking shaft rotates through manipulation of the shift lever;
   a parking gear meshed with a sprag which is actuated by the parking rod assembly, the sprag movable into and out of engagement with the parking gear; and a driving section having a driving motor assembly that drives the parking shaft such that the sprag can be engaged with or disengaged from the parking gear when the shift lever is manipulated between a parking mode and a reverse mode, wherein the driving motor generates a rotational force that is added to a disengaging force created by the parking rod assembly for disengaging the sprag from the parking gear when the disengaging force is insufficient to disengage the sprag from the parking gear.

2. The parking brake apparatus as set forth in claim 1, wherein the driving section rotates the parking shaft in opposite directions when the shift lever is manipulated from the parking mode to the reverse mode and from the reverse mode to the parking mode.

3. The parking brake apparatus as set forth in claim 1, further comprising a transmission control unit that operates the driving section.

4. The parking brake apparatus as set forth in claim 3, further comprising a hybrid control unit that receives signals indicative of operating conditions of the vehicle, the hybrid control unit generating an output signal.

5. The parking brake apparatus as set forth in claim 4, further comprising a torque control unit which receives the output signal from the hybrid control unit, the torque control unit operative to determine an engagement speed of the sprag with the parking gear and generating an output signal containing information on the engagement speed which is received by the transmission control unit.

6. A method for controlling operation of a parking brake apparatus for an automatic transmission vehicle, the method comprising the steps of:
  sensing, by a hybrid control unit, information including a speed and a gear ratio of the vehicle and an engagement speed of a sprag with respect to a parking gear when a shift lever is manipulated between a parking mode and a reverse mode, transmitting the information to a torque control unit, and judging the information in the torque control unit;
  receiving, by a transmission control ECU, the information judged in the torque control unit;
  engaging or disengaging the sprag with or from the parking gear under the control of the transmission control ECU; and
  if a primary disengaging force for disengaging the sprag from the parking gear is insufficient to disengage the sprag from the parking gear, generating an additional rotational force by a motor, and adding the additional rotational force to the primary disengaging force.

7. The method as set forth in claim 6, wherein the step of transmitting the information to the torque control unit and judging the information in the torque control unit comprises the step when the engagement speed is not larger tan a reference speed and the step when the engagement speed is larger than the reference speed.

8. The method as set forth in claim 7, wherein the step when the engagement speed is not larger than the reference speed comprises the step of operating the driving section and engaging the sprag with the parking gear.

9. The method as set forth in claim 7, wherein the step when the engagement speed is larger than the reference speed comprises the step of not operating the driving section and not engaging the sprag with the parking gear.

10. The method as set forth in claim 6, wherein the step of engaging or disengaging the sprag with or from the parking gear under the control of the transmission control ECU comprises the step of actuating the sprag and freeing the parking gear when the shift lever is manipulated from P to R.

11. The method as set forth in claim 10, wherein the step of actuating the sprag and freeing the parking gear when the shift lever is manipulated from P to R comprises the step when the sprag is disengaged from the parking gear and the step when the sprag is not disengaged from the parking gear.

12. The method as set forth in claim 11, wherein the step when the sprag is not disengaged from the parking gear comprises the steps of sensing, by the hybrid control unit, a non-disengaged state of the sprag, transmitting a signal indicative of the non-disengaged state of the sprag to the transmission control ECU, and returning to the step of actuating the sprag and freeing the parking gear when the shift lever is manipulated from P to R.

* * * * *